(12) United States Patent
Zhu et al.

(10) Patent No.: US 12,236,457 B2
(45) Date of Patent: Feb. 25, 2025

(54) SYSTEMS AND METHODS FOR MULTIDIMENSIONAL KNOWLEDGE TRANSFER FOR CLICK THROUGH RATE PREDICTION

(71) Applicant: Hong Kong Applied Science and Technology Research Institute Company Limited, Hong Kong (HK)

(72) Inventors: Qijun Zhu, Hong Kong (HK); Xin Zheng, Hong Kong (HK); Ming Ming Tan, Augusta, GA (US)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 349 days.

(21) Appl. No.: 17/880,605

(22) Filed: Aug. 3, 2022

(65) Prior Publication Data

US 2024/0046314 A1 Feb. 8, 2024

(51) Int. Cl.
*G06Q 30/0272* (2023.01)
(52) U.S. Cl.
CPC ............................. *G06Q 30/0272* (2013.01)
(58) Field of Classification Search
None
See application file for complete search history.

(56) References Cited

U.S. PATENT DOCUMENTS

| 9,549,017 B2 | 1/2017 | Zhang et al. |
| 10,559,004 B2 | 2/2020 | Yang et al. |

(Continued)

FOREIGN PATENT DOCUMENTS

| CN | 109615060 A | 4/2019 |
| CN | 110633421 A | 12/2019 |

(Continued)

OTHER PUBLICATIONS

E. Mark Milankovich, "The Cold Start Problem for Recommender Systems", available on Jul. 14, 2015, retrieved from <<https://medium.com/@markmilankovich/the-cold-start-problem-for-recommender-systems-89a76505a7>> (Year: 2015).*

(Continued)

*Primary Examiner* — Sam Refai
(74) *Attorney, Agent, or Firm* — Idea Intellectual Limited; Margaret A. Burke; Sam T. Yip

(57) ABSTRACT

A multidimensional knowledge transfer model for predicting CTR of a computational ad, the multidimensional knowledge transfer model comprises: a pre-processor for building an ad group node graph based on similarities among ad group nodes, an ad campaign node graph from merging the ad group node graph, and an ad account node graph from merging the ad campaign node graph. The multidimensional knowledge transfer model further comprises a multi-knowledge CTR prediction model for each of the ad account, ad campaign, and ad group layers. The multi-knowledge CTR prediction model predicts the respective node's CTR from the ad account node graph, ad campaign node graph, or ad group node graph, features of the audience group, and features of the node having its CTR predicted appended with the hidden vector of its parent node extracted from the upper layer multi-knowledge CTR prediction model.

18 Claims, 6 Drawing Sheets

(56) References Cited

U.S. PATENT DOCUMENTS

| | | | | |
|---|---|---|---|---|
| 2014/0068011 | A1* | 3/2014 | Zhang | H04L 67/53 709/219 |
| 2017/0161773 | A1* | 6/2017 | Xu | G06Q 30/0243 |
| 2018/0314944 | A1* | 11/2018 | Li | G06Q 30/0241 |
| 2020/0265466 | A1* | 8/2020 | Cheng | G06Q 30/0246 |

FOREIGN PATENT DOCUMENTS

| | | |
|---|---|---|
| CN | 110738314 A | 1/2020 |
| CN | 112288471 A | 1/2021 |
| CN | 113343095 A | 9/2021 |
| CN | 113723538 A | 11/2021 |

OTHER PUBLICATIONS

Jiang Zilong et al., "A CTR Prediction Approach for Advertising based on Embedding Model and Deep Learning", 2018 IEEE Intl Conf on Parallel & Distributed Processing with Applications, Ubiquitous Computing & Communications, Big Data & Cloud Computing, Social Computing & Networking, Sustainable Computing & Communications, Institute of Electrical and Electronics Engineers, Dec. 2018, pp. 744-750.

International Search Report and Written Opinion of corresponding PCT application No. PCT/CN2022/111732 mailed on Apr. 7, 2023.

"Support-vector machine", https://en.wikipedia.org/wiki/Support-vector_machine.

Steffen Rendle, "Factorization machines", 2010 IEEE International Conference on Data Mining, 2010.

Heng-Tze Cheng et al., "Wide & Deep Learning for Recommender Systems", Proceedings of the 1st Workshop on Deep Learning for Recommender Systems, Sep. 2016.

Huifeng Guo et al., "DeepFM: A Factorization-Machine based Neural Network for CTR Prediction", Proceedings of the Twenty-Sixth International Joint Conference on Artificial Intelligence, 2017, pp. 1725-1731.

Weinan Zhang et al., "Deep Learning over Multi-field Categorical Data—A Case Study on User Response Prediction", European Conference on Information Retrieval, 2016, pp. 45-57.

Yanru Qu et al., "Product-based Neural Networks for User Response Prediction", 2016 IEEE 16th International Conference on Data Mining (ICDM), Dec. 2016.

Guorui Zhou et al., "Deep Interest Network for Click-Through Rate Prediction", Proceedings of the 24th ACM SIGKDD International Conference on Knowledge Discovery & Data Mining, Jul. 2018, pp. 1059-1068.

Paul Covington et al., "Deep Neural Networks for YouTube Recommendations", Proceedings of the 10th ACM Conference on Recommender Systems, Sep. 2016, pp. 191-198.

Thomas N. Kipf et al., "Semi-Supervised Classification with Graph Convolutional Networks", International Conference on Learning Representations (ICLR), Feb. 22, 2017, pp. 1-14.

"Artificial neural network", https://en.wikipedia.org/wiki/Artificial_neural_network.

Google Ads API Reports (Metrics), https://developers.google.com/google-ads/api/fields/v10/metrics.

* cited by examiner

SYSTEMS AND METHODS FOR MULTIDIMENSIONAL KNOWLEDGE TRANSFER FOR CLICK THROUGH RATE PREDICTION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to click through rate (CTR) prediction in computational advertising. More specifically the present invention relates to techniques of CTR prediction using machine learning (ML) and deep learning (DL) models.

BACKGROUND OF THE INVENTION

CTR prediction is the task of predicting the probability of some artifact, such as a text, an image, video clip, sound clip, etc., which often represents an advertisement, displayed on a website or any widely accessible online electronic user interface will be clicked on or accessed when shown to an audience populace. There usually is a Uniform Resource Locators (URL) link embedded in the advertisement; and the primary goal of such advertisement is to attract visitors to a destination or landing webpage, or to drive online traffic to or usage of a particular website or online electronic user interface through the clicking or accessing of the advertisement.

CTR prediction is particularly important to target advertising for advertisers in planning a computational advertising campaign. A computational advertising scheme includes at least the creation of the contents of the advertisement, selection of user-searchable keywords, placements of the advertisement, budgeting, and other parameters for a targeted audience group. As such, CTR predictions are essential for properly adjusting the advertising scheme for optimized campaign performance.

Various ML and DL models have been developed for CTR prediction. These machine learning models rely on vast amount of historical data collected from various advertising channels in computing prediction results. Some of the ML and DL models being used in the art include the Support Vector Machine (SVM), which constructs a hyperplane or set of hyperplanes in a high- or infinite-dimensional space for classification and regression; factorization models, which are a class of collaborative filtering algorithms that decompose user-item interaction matrices into products of two lower dimensionality rectangular matrices; Factorization Machines (FM), which combines the advantages of SVM with factorization models for general predictor working with any real valued feature vector; and DL models based on FM.

However, the accuracies of these ML prediction models often suffer due to imbalanced data problem and cold start problem during the training of these models. Imbalanced data problem is that while there are plentiful data on certain aspects of advertising campaign, i.e., types of products being promoted, particular audience demographics, etc., there are few on other aspects. Cold start problem happens when a CTR prediction is attempted on a new advertising campaign having parameters and/or parameter values that have few precedence if not none; thus a lacking of historical data for properly training the ML prediction models.

SUMMARY OF THE INVENTION

It is an objective of the present invention to address the aforesaid imbalanced data problem and cold start problem by providing a system and a method of CTR prediction using one or more knowledge transfer models comprising one or more of a hierarchical knowledge transfer model, a horizontal knowledge transfer model, and a multidimensional knowledge transfer model.

The use of the hierarchical knowledge transfer model solves the imbalanced data problem by considering the hierarchical structure of a typical functional and data organization in computational advertising, which may be viewed as having a top layer of one or more ad account nodes, followed by an intermediate layer of one or more ad campaign nodes, then a bottom layer of one or more ad group nodes. Each ad account node has hierarchical relationships with one or more ad campaign nodes below it. Each ad campaign node has hierarchical relationships with one ad account node above it and one or more ad group nodes below it. Each ad group node has a hierarchical relationship with one ad campaign node above it. The higher layer of the node, the more data it has. Thus, under the hierarchical knowledge transfer model, the CTR prediction model of the ad account nodes is trained first, generating the representation vectors of ad account nodes. Then, the representation vectors of ad account nodes are embedded into the CTR prediction model of the next layer—the ad campaign nodes—to generate the representation vectors of the ad campaign nodes. Finally, the same step is repeated to transfer the representation knowledge of ad campaign nodes down to the ad group nodes. This hierarchical knowledge transfer model can leverage the knowledge of the upper layers to facilitate the CTR prediction of the lower layers, thus relieving the imbalanced data problem.

The use of the horizontal knowledge transfer model solves the cold start problem. Under the horizontal knowledge transfer model, a node graph of data structure of the nodes in each layer are constructed based on the nodes' features, such as the keywords of the landing pages associated with the advertisements, the user-searchable keywords associated with the advertisements, and the similarities among nodes. Based on the constructed node graph, the knowledge learned of the existing and past nodes (hence the historical data) is propagated to any new part of the graph added by the addition of new node(s), thus facilitating the CTR prediction of a new node with no or little data for training.

Lastly, the multidimensional knowledge transfer model combines the hierarchical knowledge transfer model and the horizontal knowledge transfer model to create a holistic learning framework for the CTR prediction that allows the transfer of knowledge learned along multiple dimensions, solving both the imbalanced data problem and the cold start problem.

BRIEF DESCRIPTION OF THE DRAWINGS

Embodiments of the invention are described in more details hereinafter with reference to the drawings, in which.

DETAILED DESCRIPTION

In the following description, systems and methods of predicting a probability of an artifact displayed on a website or an online electronic user interface will be accessed, or clicked, when shown to an audience group and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In computational advertising, an online advertisement (ad) is an artifact displayed on a web site or an online electronic user interface, or a search keyword for returning an Internet search engine search result having an embedded URL link for the audience to click on or access, so to direct the audience to a destination or landing webpage, or to drive online traffic to or usage of a particular website or online electronic user interface through the clicking or accessing of the advertisement.

Figure 1:
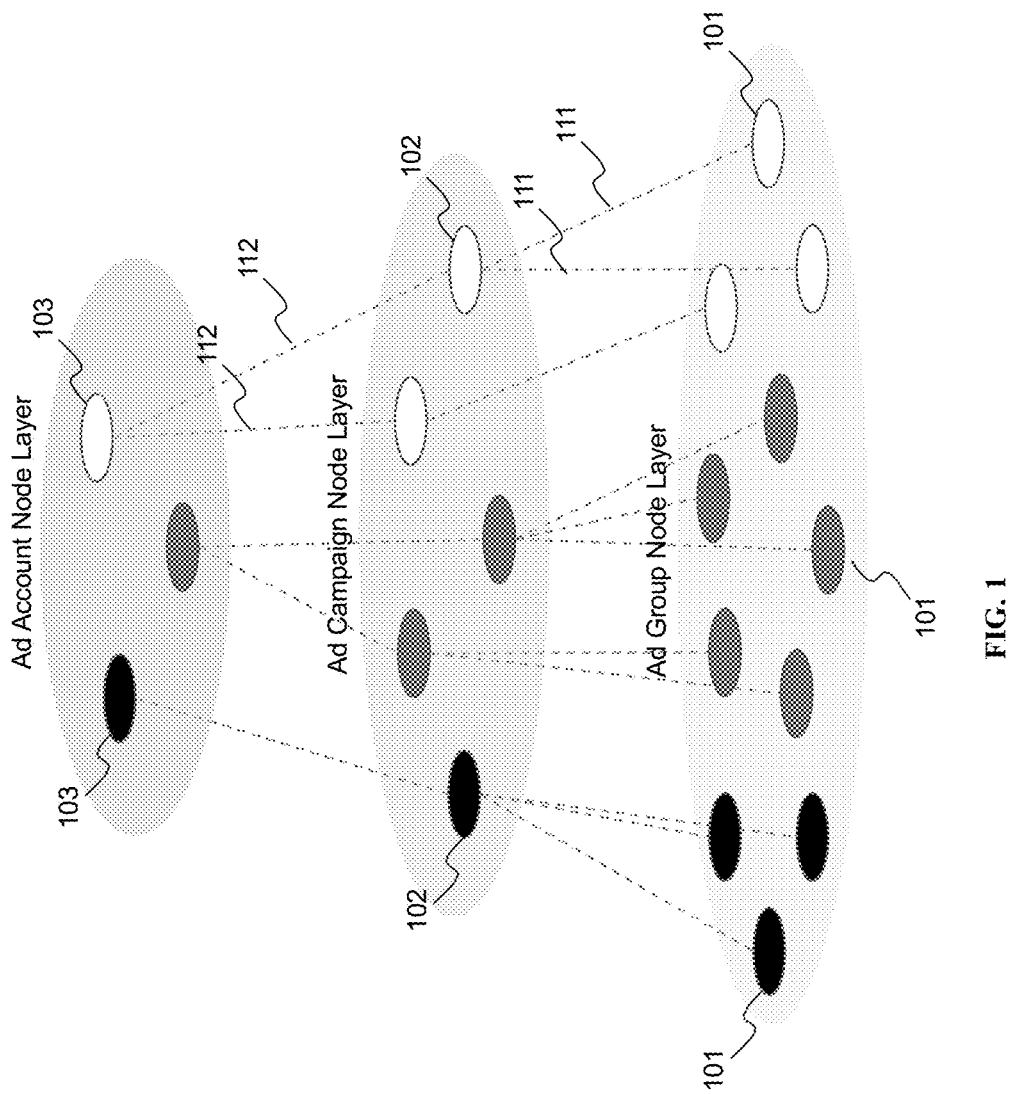
FIG. 1 depicts a logical block diagram illustrating a logical data structure of computational advertising.

Referring to FIG. 1 for the following description. In the art, it is common to structure the different aspects of online advertising into ad accounts, ad campaigns, ad groups, and ads. An ad can be a text, an image, video clip, sound clip, or a bid representing certain product or service, or aspects associated thereof, being offered by the advertiser.

An ad group contains one or more ads that share the same target. Other parameters of an ad group include a theme, a target location, a target language, a product or service being advertised. In the context of ML and DL modelling, an ad group can be represented as an ad group node 101 and its settings features may include one or more search keywords, an advertisement theme, a target location, a target language, one or more advertised products, and/or one or more advertised services of the one or more ads in the ad group node 101. An ad group node also collects performance data of its ads and the performance data may have a number of performance features, such as the number of user clicks/accesses received on its ads, advertising cost. In an exemplary embodiment, an ad group node contains the settings features and performance features as provided in Table 1 below.

TABLE 1

| Feature | Description |
|---|---|
| Settings Features | |
| Account ID | Identifier of an ad account node |
| Campaign ID | Identifier of an ad campaign node |
| Ad Group ID | Identifier of an ad group node |
| Ad Network Type | Search, content, YouTube search, or YouTube watch |
| Interaction Type | click, engagement, or video view |
| Target Location | location targeted by the ad group |
| Target Language | language targeted by the ad group |
| Performance Features | |
| Clicks | Number of clicks received |
| Impressions | count of how often the ad has appeared on a placement |
| CTR | Number of clicks the ad receives (clicks) divided by the number of times the ad is shown (impressions) |
| Cost | Sum of cost-per-click (CPC) and cost-per-thousand impressions (CPM) costs during this period |
| Interactions | Number of interactions |
| Conversions | Number of conversions |
| Engagements | Number of engagements, where an engagement occurs when a viewer expands the Lightbox ad |
| Video Views | Number of times the video ads were viewed |
| Active View Measurability | Active View Measurable Impressions over Impressions |
| Active View Impressions | A measurement of how often the ad has become viewable on a placement (viewable impressions) |
| Active View Measurable Cost | Cost measurable by Active View |
| Active View Measurable Impressions | A measurement of how often the ad has appeared on an Active View enable site (measurable impressions) |
| Active View Viewability | Active View Impressions over Active View Measurable Impressions |
| Active View CTR | Active View click-through rate |
| Active View CPM | Active View cost-per-thousand impressions |
| Avg. CPC/CPM/CPE/CPV | Average amount charged for a click/thousand impressions/an ad engagement/an ad view |

An ad campaign is a set of one or more ad groups. Ad campaigns are also often used to organize categories of products or services that an advertiser is offering. In the context of ML and DL modelling, an ad campaign can be represented as an ad campaign node 102, with its settings and performance features being the aggregate of those of the ad group nodes belonging to it.

An ad account is a set of one or more ad campaigns. The advertiser may have one or more ad accounts. In the context of ML and DL modelling, an ad account can be represented as an ad account node 103, with its settings and performance features being the aggregate of those of the ad campaign nodes belonging to it.

The one or more ad account nodes 103 form a top layer; one or more ad campaign nodes 102 form an intermediate layer; and one or more ad group nodes 101 form a bottom layer. Each ad group node 101 has an upward hierarchical relationship 111 with an ad campaign node 102 representing that the ad group node 101 belongs to that ad campaign node 102. Each ad campaign node 102 has one or more downward hierarchical relationships 111 each with an ad group node 101 representing all the ad group nodes 101 belonging to that ad campaign node 102. Each ad campaign node 102 also has an upward hierarchical relationship 112 with an ad account node 103 representing that the ad campaign node 102 belongs to that ad account node 103. Each ad account node 103 has one or more downward hierarchical relationships 112 each with an ad campaign node 102 representing all the ad campaign nodes 102 belonging to that ad account node 103. Therefore, the nodes, as organized into layers, with their hierarchical relationships form a network of nodes.

In the context of ML and DL modelling, the audience group has a number of features; for example, audience group ID, age, gender, placement type (online assets, i.e., YouTube® channel, social media site, app, etc., in which an ad is placed and viewed), etc.

To simplify the illustration of the various inventive concepts of the present invention, embodiments described herein assume the implementations of the methods and systems being based on the logical data structure having the layers of ad account nodes, ad campaign nodes, and ad group nodes set out above. However, this assumption should not be construed as limitations to the present invention. A skilled person in the art would readily implement the embodiments of the present invention in systems with different logical data structures without undue experimentation and deviation from the spirit of the present invention.

In accordance with an embodiment of the present invention, a system of CTR prediction using one or more knowledge transfer models comprising one or more of a hierarchical knowledge transfer model, a horizontal knowledge transfer model, and a multidimensional knowledge transfer model is provided. In order to build its knowledge transfer models, the system of CTR prediction first recognizes and take as input a network of nodes comprising one or more ad account nodes, one or more ad campaign nodes, and one or more ad group nodes.

Figure 2:
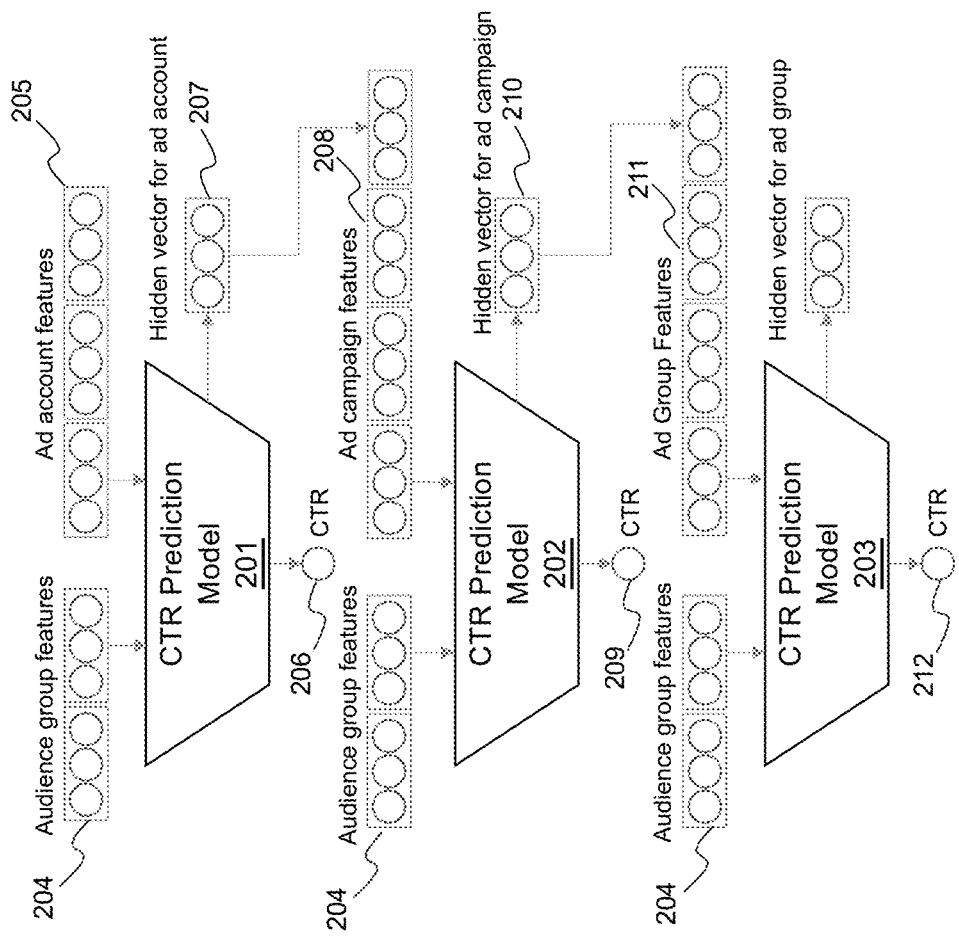
FIG. 2 depicts a schematic diagram illustrating a hierarchical knowledge transfer model in accordance with an embodiment of the present invention.

Referring to FIG. 2 for the following description. The hierarchical knowledge transfer model comprises an ad account CTR prediction model 201, an ad campaign CTR prediction model 202, and an ad group CTR prediction model 203. During run-time, the ad account CTR prediction model 201 takes as input the audience group features 204 and the settings and performance features 205 of an ad account node to generate a predicted CTR 206 of the ad account node. The ad account CTR prediction model 201 also extracts from the ad account node a hidden vector 207. The extracted hidden vector 207 is then appended to the settings and performance features 208 of an ad campaign node and be taken as input, along with the audience group features 204, by the ad campaign CTR prediction model 202 to generate a predicted CTR 209 of the ad campaign node. The ad campaign CTR prediction model 202 also extracts from the ad campaign node a hidden vector 210. The extracted hidden vector 210 is then appended to the settings and performance features 211 of an ad group node and be taken as input, along with the audience group features 204, by the ad group CTR prediction model 203 to generate a predicted CTR 212 of the ad group node.

Under the hierarchical knowledge transfer model, the ad account CTR prediction model is trained first with the settings and performance data of the ad account nodes; wherein each of the ad account's performance data is an aggregate of all of those of the ad campaign nodes belonging to the ad account; and each of the ad campaign's performance data is an aggregate of all of those of the ad group nodes belonging to the ad campaign. The hidden vectors of ad account nodes are then extracted. And the hidden vectors of ad account nodes are embedded into the ad campaign CTR prediction model by way of appending each of the hidden vectors of ad account nodes to each of its children ad campaign node's features being input to the ad campaign CTR prediction model. The hidden vectors of the ad campaign nodes are then extracted. Finally, the hidden vectors of the ad campaign nodes are embedded into the ad group CTR prediction model by way of appending each of the hidden vectors of ad campaign nodes to each of its children ad group node's features being input to the ad group CTR prediction model.

The loss function of each of the ad account CTR prediction model, ad campaign CTR prediction model, and ad group CTR prediction model can be expressed as:

$$\Sigma_{(x,y)\in S}\|y-\hat{y}(x|\Theta)\|^2+\Sigma_{\theta\in\Theta}\lambda_\theta\theta^2;$$

where S denotes the observed data, y the real CTR value, x the input of the model, $\Theta$ the model parameter set, $\hat{y}$ the predicted CTR value based on x and $\Theta$, and $\lambda_\theta \in R^+$ the regularization value for the model parameter $\theta \in \Theta$.

In one embodiment, each of the ad account CTR prediction model, ad campaign CTR prediction model, and ad group CTR prediction model is implemented as a Support Vector Machine (SVM) model. In this case, the extracted hidden vector of an ad account node, ad campaign node, or ad group node is the feature map function of the feature vector of the respective node, which can be represented by:

$$\text{hidden vector}_{node\ id}=\varphi(\text{vector}_{node\ id});$$

where $\varphi$ is the feature map of the SVM model; and node id is the ID of the ad account node, ad campaign node, or ad group node having its hidden vector extracted.

In another embodiment, each of the ad account CTR prediction model, ad campaign CTR prediction model, and ad group CTR prediction model is implemented as Factorization Machines (FMs). In this case, the extracted hidden vector of an ad account node, ad campaign node, or ad group node is the parameter vector of the field of the respective node, which can be represented by:

$$\text{hidden vector}_{node\ id}=\text{parameter vector}(\text{field}_{node\ id});$$

where node id is the ID of the ad account node, ad campaign node, or ad group node having its hidden vector extracted.

In another embodiment, each of the ad account CTR prediction model, ad campaign CTR prediction model, and ad group CTR prediction model is implemented as a Parallel-Structure DL model. In this case, the extracted hidden vector of an ad account node, ad campaign node, or ad group node is extracted from an embedding layer of the Parallel-Structure DL model in predicting the CTR of the ad account node, ad campaign node, or ad group node having its hidden vector extracted. The Parallel-Structure DL model can be, without limitation, a Wide&Deep Learning model or a DeepFM model. Other Parallel-Structure DL models are readily adoptable without undue experimentation or deviation from the spirit of the present invention.

In yet another embodiment, each of the ad account CTR prediction model, ad campaign CTR prediction model, and ad group CTR prediction model is implemented as a Serial-Structure DL model. In this case, the extracted hidden vector of an ad account node, ad campaign node, or ad group node is extracted from the feature interactions of the Serial-Structure DL model in predicting the CTR of the ad account node, ad campaign node, or ad group node having its hidden vector extracted. The Serial-Structure DL model can be, without limitation, a Factorization Machine supported Neural Network (FNN) model or a Product-based Neural Network (PNN) model. Other Serial-Structure DL models are readily adoptable without undue experimentation or deviation from the spirit of the present invention.

In yet another embodiment, each of the ad account CTR prediction model, ad campaign CTR prediction model, and ad group CTR prediction model is implemented as a General Interest-Structure DL model. In this case, the extracted hidden vector of an ad account node, ad campaign node, or ad group node is extracted from the feature embedding layer of the General Interest-Structure DL model in predicting the CTR of the ad account node, ad campaign node, or ad group node having its hidden vector extracted. The General Interest-Structure DL model can be, without limitation, a Deep Interest Network (DIN) model or a model based on the Deep Neural Networks for YouTube Recommendations (YouTubeNet). Other Interest-Structure DL models are readily adoptable without undue experimentation or deviation from the spirit of the present invention.

Figure 3:
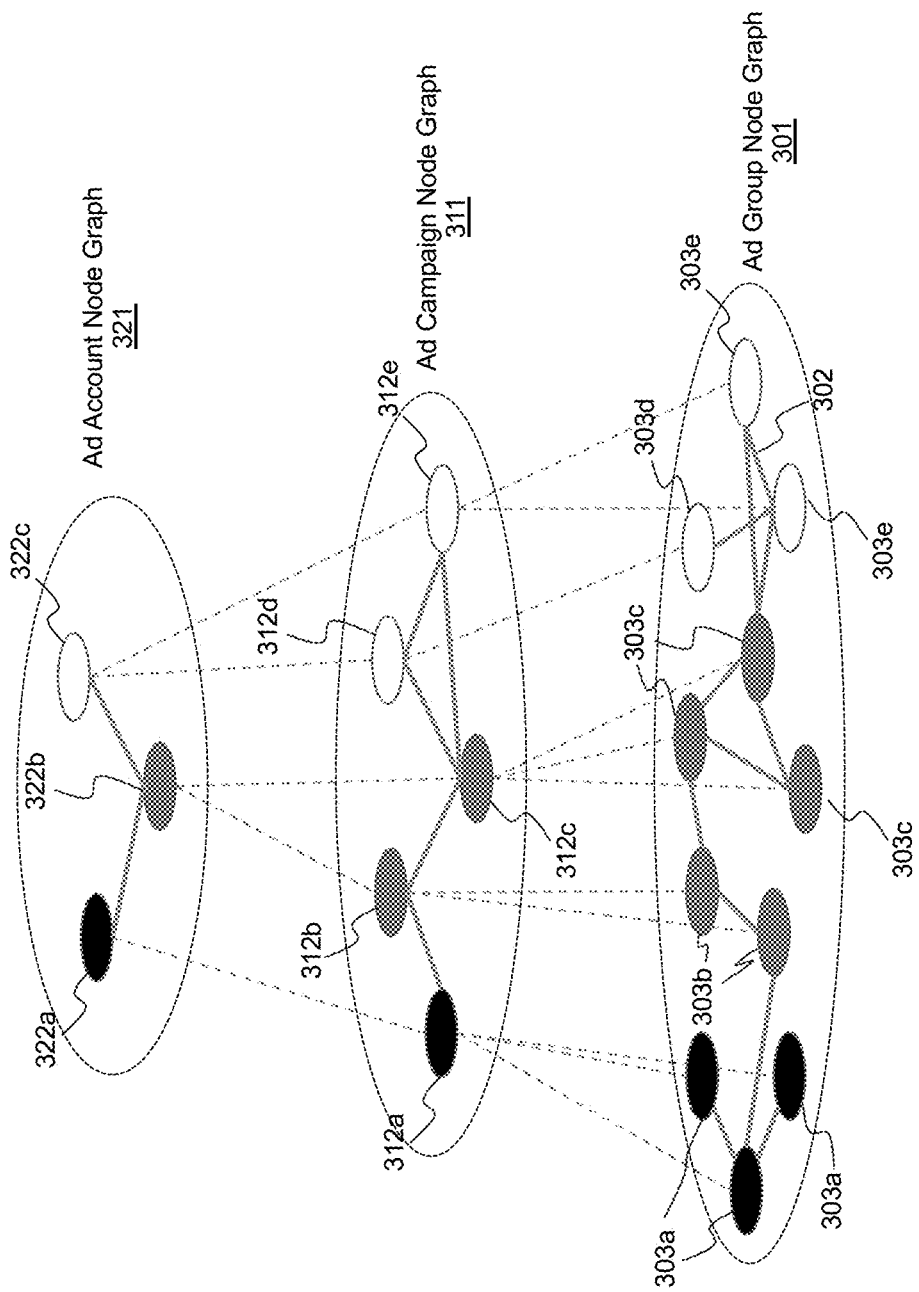
FIG. 3 depicts a logical block diagram illustrating the node graphs under a horizontal knowledge transfer model in accordance with an embodiment of the present invention.
Figure 4:
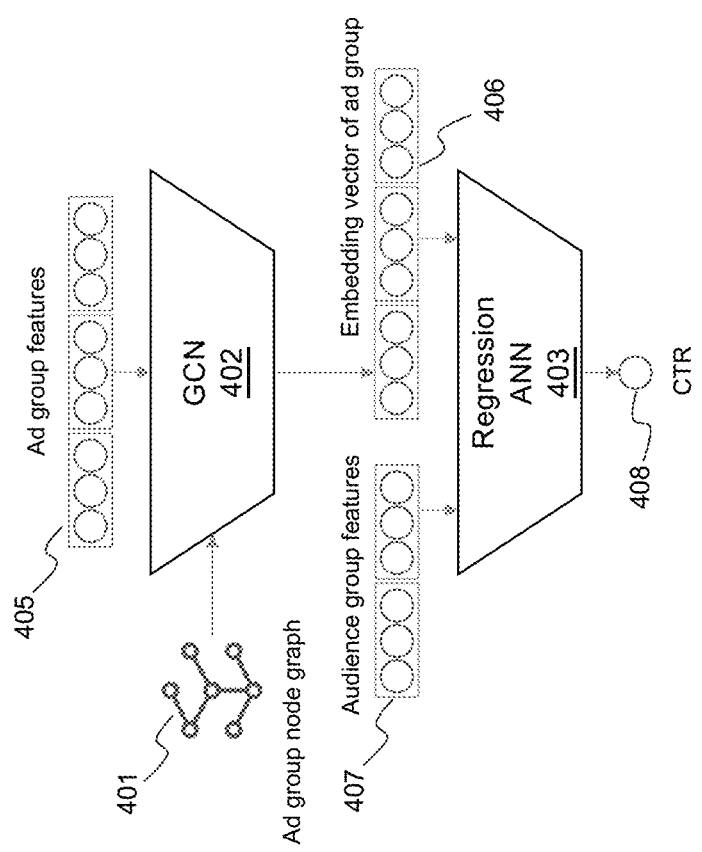
FIG. 4 depicts a schematic diagram illustrating the horizontal knowledge transfer model.

Referring to FIGS. 3 and 4 for the following description. The horizontal knowledge transfer model comprises an ad group node graph 301 built by a logical pre-processor based on similarities among the ad group nodes 303a, 303b, 303c, 303d, and 303e represented by the edges 302 of the ad group node graph 301. In one embodiment, the similarities are calculated based on one or more keywords, which can be extracted from the destination(s) or landing webpage(s) associated with the ads in each of the ad group nodes 303a, 303b, 303c, 303d, and 303e. In other embodiments, the similarities are calculated based on one or more of the settings features of each of the ad group nodes 303a, 303b, 303c, 303d, and 303e.

The horizontal knowledge transfer model further comprises a Graph Convolution Network (GCN) 402. During run-time, the GCN 402 takes as input the ad group node graph 301 and the settings and performance features 405 of the ad group nodes to generate an ad group embedding vectors 406 of the ad group nodes, wherein the ad group node 405 represents the one or more ads having their CTR being predicted and the ad group node 405 contains the settings features of these ads. Each neural network layer $l$ of the GCN 402 can be represented by the rectifier activation function:

$$H^{(l+1)} = ReLU\left(\tilde{D}^{-\frac{1}{2}} \tilde{A} \tilde{D}^{-\frac{1}{2}} H^{(l)} W_g^{(l)}\right);$$

where $\tilde{A}=A+I_N$ is the adjacency matrix of the ad group node graph G with added self-connections, $I_N$ is the identity matrix, $\tilde{D}_{ii}=\Sigma_j \tilde{A}_{ij}$, $W_g^{(l)}$ is a layer-specific trainable weight matrix, and $H^{(l)}$ is the matrix of activations in the $l^{th}$ layer.

The horizontal knowledge transfer model further comprises a Regression Artificial Neural Network (ANN) 403, which takes as input the ad group embedding vector 406 and the audience group features 407 to generate a predicted CTR 408 for the ad group node. Each neural network layer $l$ of the Regression ANN 403 may be represented by the rectifier activation function:

$$a^{(l+1)} = ReLU(W_r^{(l)} a^{(l)} + b^{(l)});$$

where $W_r^{(l)}$ and $b^{(l)}$ are the parameters of the neural network layer $l$, and $a^{(l)}$ is the activations in the $l^{th}$ layer. its output:

$$\hat{y}=a^L;$$

which means the activation $\alpha^L \in R^+$ in the last layer L is used as the predicted CTR value $\hat{y}$. and its loss function:

$$\Sigma_{(x,y)\in S} \|y-\hat{y}(x|\Theta)\|^2 + \Sigma_{\theta \in \Theta} \lambda_\theta \theta^2;$$

where S denotes the observed data, y the real CTR value, x the input of the model, $\Theta$ the model parameter set, $\hat{y}$ the predicted CTR value based on x and $\Theta$, and $\lambda_\theta \in R^+$ the regularization value for the model parameter $\theta \in \Theta$.

During training, an ad group node graph of one or more ad group nodes, the settings and performance features of the ad group nodes, the features of the audience groups, and the past CTR values of the pre-existing ad group nodes are taken as training dataset for training the GCN and the Regression ANN, with the Regression ANN is trained using only the past CTR values of the pre-existing ad group nodes.

The aforementioned components of the horizontal knowledge transfer model are duplicated for the ad campaign node layer and the ad account node layer. For the ad campaign node layer, a GCN takes as input an ad campaign node graph 311, which is built by merging the nodes in the ad group node graph 301 by the ad group nodes belonging to each of the ad campaign nodes 312a, 312b, 312c, 312d, and 312e by the logical pre-processor. For example, ad group nodes 303a into ad campaign nodes 412a; and ad group nodes 303b into ad campaign node 312b. The GCN also takes as input settings and performance features of ad campaign nodes, and with the ad campaign node graph 311, generates ad campaign embedding vectors. The ad campaign embedding vector is then input to a Regression ANN; along with the audience group features as input, the Regression ANN generates a predicted CTR for the ad campaign node.

And during training, the ad campaign node graph of one or more ad campaign nodes, the settings and performance features of the ad campaign nodes, features of the audience groups, and the past CTR values of the pre-existing ad campaign nodes are taken as training dataset for training the GCN and the Regression ANN, with the Regression ANN is trained using only the past CTR values of the pre-existing ad campaign nodes.

Similarly for the ad account node layer, a GCN takes as input an ad account node graph 321, which is built by merging the nodes in the ad campaign node graph 311 by the ad campaign nodes belonging to each of the ad account nodes 322a, 322b, and 322c by the logical pre-processor. For example, ad campaign nodes 312a into ad account nodes 322a; and ad campaign nodes 312b and 312c into ad account node 322b. The GCN also takes as input settings and performance features of ad account nodes, and with the ad account node graph 321, generates ad account embedding vectors. The ad account embedding vector is then input to a Regression ANN; along with the audience group features as input, the Regression ANN generates a predicted CTR for the ad account node.

And during training, the ad account node graph of one or more ad account nodes, the settings and performance features of the ad account nodes, features of the audience groups, and the past CTR values of the pre-existing ad account nodes are taken as training dataset for training the GCN and the Regression ANN, with the Regression ANN is trained using only the past CTR values of the pre-existing ad account nodes.

Figure 5A:
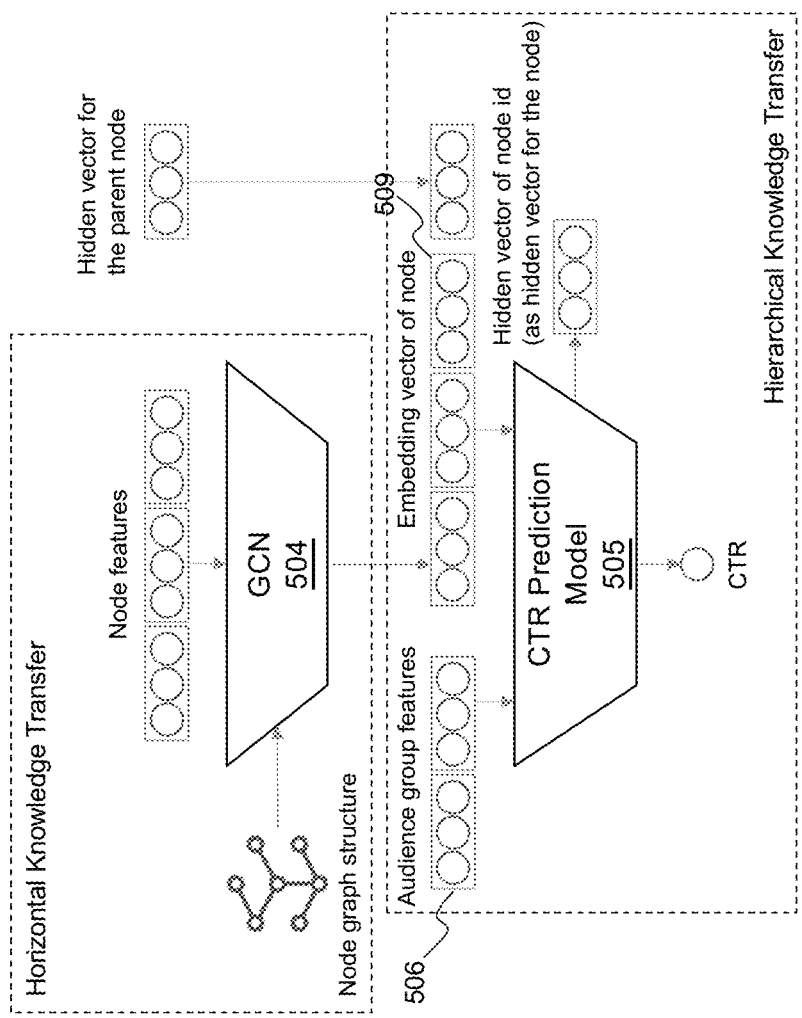
FIG. 5A depicts a schematic diagram illustrating a multidimensional knowledge transfer model in accordance with an embodiment of the present invention.
Figure 5B:
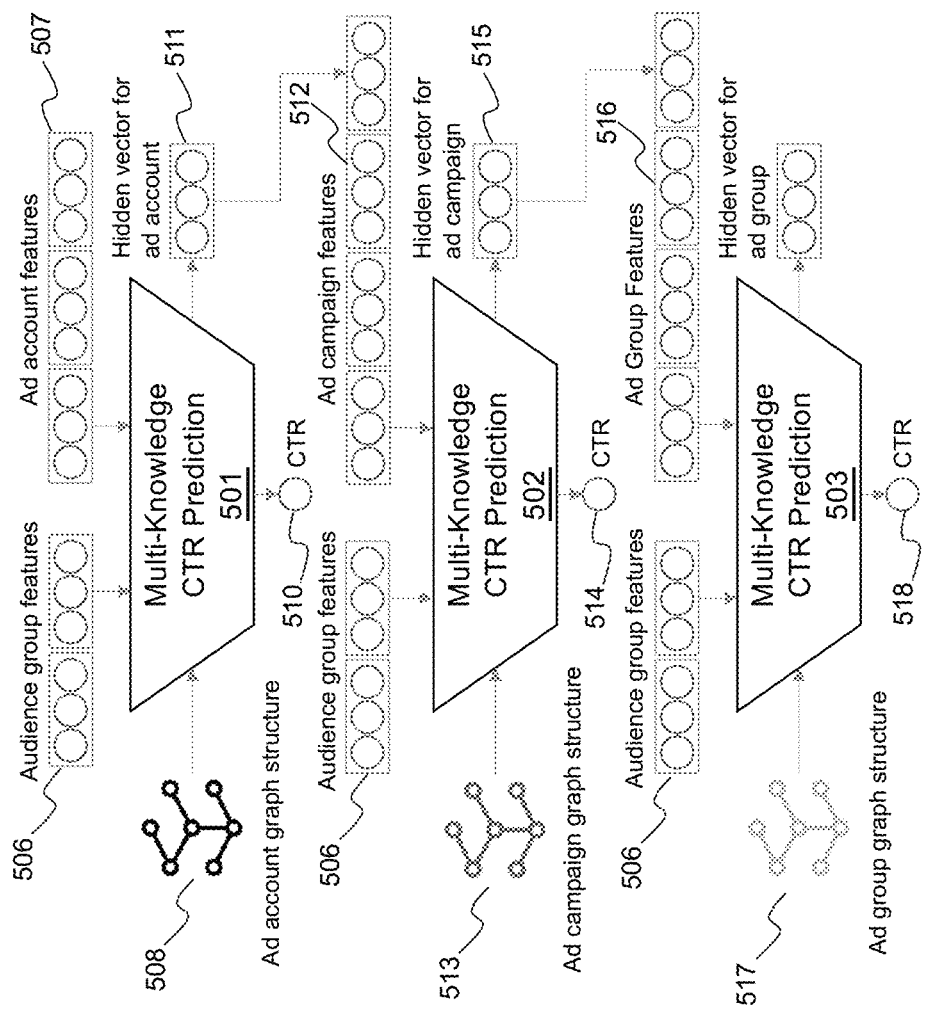
FIG. 5B depicts a schematic diagram further illustrating the multidimensional knowledge transfer model.

Referring to FIGS. 5A and 5B for the following description. The multidimensional knowledge transfer model combines the hierarchical knowledge transfer model and the horizontal knowledge transfer model. The multidimensional knowledge transfer model comprises an ad account multi-knowledge CTR prediction model 501, an ad campaign multi-knowledge CTR prediction model 502, and an ad group multi-knowledge CTR prediction model 503. Each of multi-knowledge CTR prediction models comprises a GCN 504 of the horizontal knowledge transfer model and a CTR prediction model 505, which is the same as the CTR prediction model 201, 202, or 203 of the hierarchical knowledge transfer model corresponding to the ad account node layer, the ad campaign node layer, or the ad group node layer. The multidimensional knowledge transfer model further comprises an ad account node graph 508, an ad campaign node graph 513, and an ad group node graph 517 built by the logical pre-processor of the horizontal knowledge transfer model as described above under a pre-run-time process.

During run-time, the ad account multi-knowledge CTR prediction model 501 takes as input the audience group features 506, the settings and performance features 507 of one or more target ad account nodes having their CTRs predicted, and the ad account node graph 508 to generate a predicted CTR 510 of each of the target ad account nodes; wherein each of the target ad account node may represent a newly created ad account, or an existing ad account that has its features modified and/or its children ad campaign node(s) and/or ad group nodes(s) modified. Within the ad account multi-knowledge CTR prediction model 501, the settings and performance features 507 of the target ad account nodes and the ad account node graph 508 are input into its GCN to generate embedding vectors 509 for inputting to its CTR prediction model along with the audience group features 506 to generate the predicted CTR 510 of each of the target ad account nodes. The CTR prediction model of the ad account multi-knowledge CTR prediction model 501 also extracts from each of the target ad account nodes a hidden vector 511.

For the ad campaign node layer, the extracted hidden vector 511 is then appended to the settings features 512 of a target ad campaign node and be taken as input, along with the audience group features 506 and the target ad campaign node graph 513, by the ad campaign multi-knowledge CTR prediction model 502 to generate a predicted CTR 514 of the target ad campaign node. The target ad campaign node may represent a newly created ad campaign, or an existing ad campaign that has its features modified and/or its children ad group nodes(s) modified that belongs to one of the target ad accounts. The ad campaign multi-knowledge CTR prediction model 502 also extracts from the target ad campaign node a hidden vector 515. Internal to the ad campaign multi-knowledge CTR prediction model 502, its GCN and CTR prediction model function in the same way as those in the ad group multi-knowledge CTR prediction model 501.

Lastly for the ad group node layer, the extracted hidden vector 515 is then appended to the settings features 516 of a target ad group node and be taken as input, along with the audience group features 506 and the target ad group node graph 517, by the ad group CTR prediction model 503 to generate a predicted CTR 518 of the target ad group node. The target ad group node may represent a newly created ad group or a modified existing ad group that belongs to the target ad campaign. Similarly, internal to the ad group multi-knowledge CTR prediction model 503, its GCN and CTR prediction model function in the same way as those in the ad group multi-knowledge CTR prediction model 501.

The logical functional units, modules, processors, and pre-processors of the prediction and knowledge transfer ML and DL models in accordance with the embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media, transient and non-transient memory devices having computer instructions or software codes stored therein which can be used to program computers or microprocessors to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system for predicting a probability of a computational advertisement (ad) displayed on a website or an online electronic user interface will be accessed when shown to an audience group, the system comprising:
    a multidimensional knowledge transfer model, implemented by one or more processors, the multidimensional knowledge transfer model comprising:
        a logical pre-processor configured to build:
            an ad group node graph of a plurality of ad group nodes based on one or more feature similarities among the ad group nodes;
            an ad campaign node graph of one or more ad campaign nodes from merging nodes in the ad group node graph of ad group nodes belonging to each of the ad campaign nodes; and
            an ad account node graph of one or more ad account nodes from merging nodes in the ad campaign node graph of ad campaign nodes belonging to each of the ad account nodes;
        an ad account multi-knowledge click-through-rate (CTR) prediction model comprising a first horizontal knowledge transfer model for solving cold start problem and a first hierarchical knowledge transfer model for solving imbalanced data problem, the ad account multi-knowledge CTR prediction model having trained to predict an ad account CTR for an ad account having its CTR predicted from the ad account node graph, features of the audience group, features of an ad account node of the ad account having its CTR predicted by the first horizontal knowledge transfer model, and features of other ad account nodes;

an ad campaign multi-knowledge CTR prediction model comprising a second horizontal knowledge transfer model for solving cold start problem and a second hierarchical knowledge transfer model for solving imbalanced data problem, the ad campaign multi-knowledge CTR prediction model having trained to predict an ad campaign CTR for an ad campaign having its CTR predicted from the ad campaign node graph, features of the audience group, features of an ad campaign node of the ad campaign having its CTR predicted appended with an ad account node hidden vector, and features of other ad campaign nodes;

wherein the ad campaign having its CTR predicted belongs to the ad account having its CTR predicted; and wherein the ad account node hidden vector is extracted from the ad account multi-knowledge CTR prediction model in predicting the CTR of the ad account having its CTR predicted; and an ad group multi-knowledge prediction model comprising a third horizontal knowledge transfer model for solving cold start problem and a third hierarchical knowledge transfer model for solving imbalanced data problem, the ad group multi-knowledge prediction model having trained to predict an ad group CTR for an ad group having its CTR predicted from the ad group node graph, features of the audience group, features of an ad group node of the ad group having its CTR predicted appended with an ad campaign node hidden vector, and features of other ad group nodes;

wherein the ad group having its CTR predicted belongs to the ad campaign having its CTR predicted; and wherein the ad campaign node hidden vector is extracted from the ad campaign multi-knowledge CTR prediction model in predicting the CTR of the ad campaign having its CTR predicted;

wherein the ad group having its CTR predicted comprises the computational ad, and the predicted ad group CTR indicates the probability of the computational ad will be accessed; and wherein each of the ad account multi-knowledge CTR prediction model, the ad campaign multi-knowledge CTR prediction model, and the ad group multi-knowledge prediction model is implemented by a Support Vector Machine neural network, a Factorization Machine neural network, a Parallel-Structure deep learning neural network, a Serial-Structure deep learning neural network, or a General Interest-Structure deep learning neural network.

2. The system of claim 1,
wherein the logical pre-processor is further configured to build the ad group node graph based on the feature similarities among the ad group nodes comprising one or more keywords of the landing pages associated with one or more ads in each of the ad group nodes.

3. The system of claim 1,
wherein each of the first, the second, and the third horizontal knowledge transfer models comprises one or more of a Graph Convolution Network (GCN) and a Regression Artificial Neural Network (ANN).

4. The system of claim 1,
wherein during training, the ad account multi-knowledge CTR prediction model is trained first with ad account settings and performance data of a plurality of ad accounts;
wherein the ad account performance data is an aggregate of all ad campaign performance data of all ad campaigns belonging to the ad accounts; and
wherein each of the ad campaign performance data is an aggregate of all ad group performance data of all ad groups belonging to the ad campaigns.

5. The system of claim 4,
wherein the ad campaign multi-knowledge CTR prediction model is trained after the training of the ad account multi-knowledge CTR prediction model;
wherein hidden vectors of the ad account nodes are embedded into the ad campaign multi-knowledge CTR prediction model by way of appending each of the hidden vectors of ad account nodes to each of the ad account nodes' children ad campaign node's features being input to the ad campaign multi-knowledge CTR prediction model.

6. The system of claim 5,
wherein the ad group multi-knowledge CTR prediction model is trained after the training of the ad campaign multi-knowledge CTR prediction model;
wherein hidden vectors of the ad campaign nodes are embedded into the ad group multi-knowledge CTR prediction model by way of appending each of the hidden vectors of ad campaign nodes to each of the ad campaign nodes' children ad group node's features being input to the ad group multi-knowledge CTR prediction model.

7. The system of claim 1, wherein during training:
an ad group node graph of one or more ad group nodes, settings and performance features of the ad group nodes, and features of one or more audience groups, and past CTR values of pre-existing ad group nodes are taken as training dataset for training the ad group multi-knowledge CTR prediction model;
an ad campaign node graph of one or more ad campaign nodes, settings and performance features of the ad campaign nodes, and the features of the audience groups, and past CTR values of pre-existing ad campaign nodes are taken as training dataset for training the ad campaign multi-knowledge CTR prediction model;
an ad account node graph of one or more ad account nodes, settings and performance features of the ad account nodes, and the features of the audience groups, and past CTR values of pre-existing ad account nodes are taken as training dataset for training the ad account multi-knowledge CTR prediction model.

8. The system of claim 1, wherein the features of the ad group node of the ad group having its CTR predicted and the other ad group nodes comprise:
settings features comprising: account ID, campaign ID, ad group ID, ad network type, interaction type, target location, and target language; and
performance features comprising: clicks, impressions, click-through-rate (CTR), cost, interactions, conversions, engagements video views, active view measurability, active view impressions, active view measurable cost, active view measurable impressions, active view viewability, active CTR, active view cost-per-thousand impressions (CPM), average cost-per-click, average CPM, average cost-per-engagement (CPE), and average cost-per-view (CPV).

9. The system of claim 1, wherein the features of the audience group comprise audience group ID, age, gender, and placement type.

10. A computer-implemented method for predicting a probability of a computational advertisement (ad) displayed on a website or an online electronic user interface will be accessed when shown to an audience group, the method comprising:

executing a multidimensional knowledge transfer model to predict the probability of the computational ad will be accessed, the multidimensional knowledge transfer model comprising:

a logical pre-processor configured to build:

an ad group node graph of a plurality of ad group nodes based on one or more feature similarities among the ad group nodes;

an ad campaign node graph of one or more ad campaign nodes from merging nodes in the ad group node graph of ad group nodes belonging to each of the ad campaign nodes; and an ad account node graph of one or more ad account nodes from merging nodes in the ad campaign node graph of ad campaign nodes belonging to each of the ad account nodes;

an ad account multi-knowledge click-through-rate (CTR) prediction model comprising a first horizontal knowledge transfer model for solving cold start problem and a first hierarchical knowledge transfer model for solving imbalanced data problem, the ad account multi-knowledge CTR prediction model having trained to predict an ad account CTR for an ad account having its CTR predicted from the ad account node graph, features of the audience group, features of an ad account node of the ad account having its CTR predicted by the first horizontal knowledge transfer model, and features of other ad account nodes;

an ad campaign multi-knowledge CTR prediction model comprising a second horizontal knowledge transfer model for solving cold start problem and a second hierarchical knowledge transfer model for solving imbalanced data problem, the ad campaign multi-knowledge CTR prediction model having trained to predict an ad campaign CTR for an ad campaign having its CTR predicted from the ad campaign node graph, features of the audience group, features of an ad campaign node of the ad campaign having its CTR predicted appended with an ad account node hidden vector, and features of other ad campaign nodes;

wherein the ad campaign having its CTR predicted belongs to the ad account having its CTR predicted; and wherein the ad account node hidden vector is extracted from the ad account multi-knowledge CTR prediction model in predicting the CTR of the ad account having its CTR predicted; and an ad group multi-knowledge prediction model comprising a third horizontal knowledge transfer model for solving cold start problem and a third hierarchical knowledge transfer model for solving imbalanced data problem, the ad group multi-knowledge prediction model having trained to predict an ad group CTR for an ad group having its CTR predicted from the ad group node graph, features of the audience group, features of an ad group node of the ad group having its CTR predicted appended with an ad campaign node hidden vector, and features of other ad group nodes;

wherein the ad group having its CTR predicted belongs to the ad campaign having its CTR predicted; and wherein the ad campaign node hidden vector is extracted from the ad campaign multi-knowledge CTR prediction model in predicting the CTR of the ad campaign having its CTR predicted;

wherein the ad group having its CTR predicted comprises the computational ad, and the predicted ad group CTR indicates the probability of the computational ad will be accessed; and wherein each of the ad account multi-knowledge CTR prediction model, the ad campaign multi-knowledge CTR prediction model, and the ad group multi-knowledge prediction model is implemented by a Support Vector Machine neural network, a Factorization Machine neural network, a Parallel-Structure deep learning neural network, a Serial-Structure deep learning neural network, or a General Interest-Structure deep learning neural network.

11. The method of claim 10,
wherein the logical pre-processor is further configured to build the ad group node graph based on the feature similarities among the ad group nodes comprising one or more keywords of the landing pages associated with one or more ads in each of the ad group nodes.

12. The method of claim 10,
wherein each of the first, the second, and the third horizontal knowledge transfer models comprises one or more of a Graph Convolution Network (GCN) and a Regression Artificial Neural Network (ANN).

13. The method of claim 10,
wherein during training, the ad account multi-knowledge CTR prediction model is trained first with ad account settings and performance data of a plurality of ad accounts;
wherein the ad account performance data is an aggregate of ad campaign performance data of all ad campaigns belonging to the ad accounts; and
wherein the ad campaign performance data is an aggregate of ad group performance data of all ad groups belonging to the ad campaigns.

14. The method of claim 13,
wherein the ad campaign multi-knowledge CTR prediction model is trained after the training of the ad account multi-knowledge CTR prediction model;
wherein hidden vectors of the ad account nodes are embedded into the ad campaign multi-knowledge CTR prediction model by way of appending each of the hidden vectors of ad account nodes to each of the ad account nodes' children ad campaign node's features being input to the ad campaign multi-knowledge CTR prediction model.

15. The method of claim 14,
wherein the ad group multi-knowledge CTR prediction model is trained after the training of the ad campaign multi-knowledge CTR prediction model;
wherein hidden vectors of the ad campaign nodes are embedded into the ad group multi-knowledge CTR prediction model by way of appending each of the hidden vectors of ad campaign nodes to each of the ad campaign nodes' children ad group node's features being input to the ad group multi-knowledge CTR prediction model.

16. The method of claim 10, wherein during training:
an ad group node graph of one or more ad group nodes, settings and performance features of the ad group nodes, features of one or more audience groups, and past CTR values of pre-existing ad group nodes are taken as training dataset for training the ad group multi-knowledge CTR prediction model;
an ad campaign node graph of one or more ad campaign nodes, settings and performance features of the ad campaign nodes, and the features of the audience groups, and past CTR values of pre-existing ad campaign nodes are taken as training dataset for training the ad campaign multi-knowledge CTR prediction model;
an ad account node graph of one or more ad account nodes, settings and performance features of the ad account nodes, and the features of the audience groups, and past CTR values of pre-existing ad account nodes are taken as training dataset for training the ad account multi-knowledge CTR prediction model.

17. The method of claim 10, wherein the features of the ad group node of the ad group having its CTR predicted and the other ad group nodes comprise:
settings features comprising: account ID, campaign ID, ad group ID, ad network type, interaction type, target location, and target language; and
performance features comprising: clicks, impressions, click-through-rate (CTR), cost, interactions, conversions, engagements video views, active view measurability, active view impressions, active view measurable cost, active view measurable impressions, active view viewability, active CTR, active view cost-per-thousand impressions (CPM), average cost-per-click, average CPM, average cost-per-engagement (CPE), and average cost-per-view (CPV).

18. The method of claim 10, wherein the features of the audience group comprise audience group ID, age, gender, and placement type.

* * * * *